United States Patent
Sato

(10) Patent No.: US 10,024,512 B2
(45) Date of Patent: Jul. 17, 2018

(54) VEHICLE LIGHTING DEVICE

(71) Applicant: Stanley Electric Co., Ltd., Tokyo (JP)

(72) Inventor: Koji Sato, Saitama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/225,554

(22) Filed: Aug. 1, 2016

(65) Prior Publication Data
US 2017/0059106 A1 Mar. 2, 2017

(30) Foreign Application Priority Data

Aug. 24, 2015 (JP) ................................ 2015-164745

(51) Int. Cl.
| | |
|---|---|
| *F21S 41/147* | (2018.01) |
| *F21S 8/10* | (2006.01) |
| *F21V 8/00* | (2006.01) |
| *F21S 41/141* | (2018.01) |
| *F21S 41/24* | (2018.01) |
| *F21S 43/14* | (2018.01) |
| *F21S 43/237* | (2018.01) |

(Continued)

(52) U.S. Cl.
CPC ......... *F21S 48/1241* (2013.01); *F21S 41/141* (2018.01); *F21S 41/147* (2018.01); *F21S 41/24* (2018.01); *F21S 43/14* (2018.01); *F21S 43/237* (2018.01); *F21S 43/245* (2018.01); *F21S 43/247* (2018.01); *F21S 43/249* (2018.01); *G02B 6/0038* (2013.01)

(58) Field of Classification Search
CPC ............... F21S 48/2237; F21S 48/2281; F21S 48/1159; G02B 6/0388
See application file for complete search history.

(56) References Cited

U.S. PATENT DOCUMENTS

| | | | | |
|---|---|---|---|---|
| 2009/0201696 | A1* | 8/2009 | Kamikatano | G02B 6/001 362/551 |
| 2009/0207344 | A1* | 8/2009 | Ono | G02B 6/0038 349/65 |

(Continued)

FOREIGN PATENT DOCUMENTS

| | | |
|---|---|---|
| JP | 2006-12510 A | 1/2006 |
| JP | 2011-198537 A | 10/2011 |

OTHER PUBLICATIONS

The extended European search report for the related European Patent Application No. 16182467.7 dated Jan. 20, 2017.

*Primary Examiner* — Anh Mai
*Assistant Examiner* — Zachary J Snyder
(74) *Attorney, Agent, or Firm* — Kenealy Vaidya LLP

(57) ABSTRACT

A vehicle lighting device includes a light guide lens, a light source and a reflector. The long light guide lens extends in a direction obliquely tilted with respect to a front-rear direction. The light source is disposed opposite an end of the light guide lens. The reflector is disposed behind the light guide lens. The light guide lens comprises a front face parallel to the longitudinal direction and a rear face with lens cuts aligned in the longitudinal direction. Each of the lens cuts comprises a rear first prism face that stands backward and a front second prism face parallel to the front face. Light that has exited backward from the light guide lens through the first prism face of a lens cut is reflected forward on the reflector toward the second prism face of a different lens cut.

2 Claims, 5 Drawing Sheets

(51) Int. Cl.
*F21S 43/245* (2018.01)
*F21S 43/249* (2018.01)
*F21S 43/247* (2018.01)

(56) References Cited

U.S. PATENT DOCUMENTS

| | | | |
|---|---|---|---|
| 2010/0254152 A1* | 10/2010 | Taleb-Bendiab | B60Q 1/0035 362/551 |
| 2011/0242831 A1 | 10/2011 | Okui et al. | |
| 2011/0267659 A1* | 11/2011 | Kawano | G02B 6/0038 358/474 |
| 2012/0314448 A1 | 12/2012 | Nakada | |

* cited by examiner

VEHICLE LIGHTING DEVICE

CROSS REFERENCE TO RELATED APPLICATION

This application is based upon and claims the benefit of priority under 35 USC 119 of Japanese Patent Application No. 2015-164745 filed on Aug. 24, 2015, the entire disclosure of which, including the description, claims, drawings and abstract, is incorporated herein by reference in its entirety.

BACKGROUND OF THE INVENTION

1. Field of the Invention

The present invention relates to a vehicle lighting device installed in a vehicle. In particular, the present invention relates to a technique of emitting light forward from a long light guide lens that is obliquely tilted with respect to the front-rear direction.

2. Description of Related Art

Vehicle lighting devices installed in vehicles that emit light from a long light guide lens have been known in the art. In vehicle lighting devices of this type, light enters a light guide lens through a side end face in the longitudinal direction. The incident light is guided in the longitudinal direction, is reflected on lens cuts in the rear face and exits through the front face, so that the light is emitted from the front face of the light guide lens.

However, when the light guide lens of such vehicle lighting devices is disposed extending in an obliquely tilted direction with respect to the front-rear direction of the vehicle lighting device, the light that has entered the light guide lens through a side end face in the longitudinal direction cannot exit forward, i.e. such vehicle lighting devices cannot emit light forward from the front face of the light guide lens.

Specifically, when light is emitted from the front face of a long light guide lens that extends obliquely backward from the right to the left as illustrated in FIG. 6A, light that is emitted from a light source (not shown) opposed to the side end face at the front side in the longitudinal direction is guided in the light guide lens in the obliquely backward direction along the light guide lens. To emit the light forward from the front face of the light guide lens, it is required to internally reflect the light on lens cuts in the rear face at an acute angle. However, when the rear faces of the lens cuts are formed at a steep angle for this purpose, the light escapes backward through the faces. To prevent the light from escaping through the lens cuts, the rear faces of the lens cuts cannot be formed at a very steep angle. As a result, it is impossible to emit the light forward from the light guide lens.

To cope with the problem, a vehicle lighting device described in JP 2011-198537A includes a reflector disposed behind a light guide lens, in which forward light is achieved by reflecting the light that has escaped backward out of the light guide lens on the reflector so that the light re-enters the light guide lens. In more detail, the light that has escaped backward out of the light guide lens is reflected on the reflector at a relatively moderate angle as illustrated in FIG. 6B. Then, the light re-enter the light guide lens through front faces of the lens cuts where the light is refracted, and the incident light is further internally reflected forward on rear faces of the lens cuts.

SUMMARY OF THE INVENTION

However, the total number of refractions and reflections is high in the vehicle lighting device of JP 2011-198537A since forward light is achieved by repeating refractions and reflections at a relatively moderate angle on the light guide lens and the reflector. In particular, a refraction and a reflection in the same lens cut is required when light re-enters the light guide lens and changes its direction to a greater extent. This results in a large loss of the light due to the refraction and the reflection, and the optical efficiency is therefore decreased to a great extent.

The present invention has been made in order to solve the problem, and an object thereof is to provide a vehicle lighting device with improved optical efficiency, which emits light forward from the front face of a tilted light guide lens with respect to the front-rear direction.

In order to realize the above object, according to a first aspect of the present invention, there is provided a vehicle lighting device, including:
- a long light guide lens disposed extending in a direction obliquely tilted with respect to a front-rear direction;
- a light source disposed opposite an end at a front side in a longitudinal direction of the light guide lens; and
- a reflector disposed behind the light guide lens along the longitudinal direction,
- wherein the light guide lens comprises a front face substantially parallel to the longitudinal direction and a rear face with lens cuts aligned in the longitudinal direction,
- wherein each of the lens cuts comprises a rear first prism face that stands backward at an steep angle with respect to the longitudinal direction and a front second prism face that is formed in a flat shape substantially parallel to the front face and continues to a rear end of the first prism face, and
- wherein light that has exited backward from the light guide lens through the first prism face of a lens cut is reflected forward on the reflector toward the second prism face of a different lens cut that is located behind the lens cut.

According to the present invention, the light emitted from the light source enters the light guide lens through an end at the front side in the longitudinal direction, is guided inside the light guide lens substantially in the longitudinal direction thereof, and then exits backward from the light guide lens through the first prism faces of the lens cuts in the rear face. This light is reflected forward on the reflector and re-enters the light guide lens through the flat second prism faces of the lens cuts substantially parallel to the front face of the light guide lens, in which the light that has exited through a lens cut re-enters through a different lens cut that is located behind the lens cut. Thereafter, the light is emitted forward from the front face.

In this way, the light undergoes only a refraction when it re-enters the light guide lens through the second prism faces of the lens cuts. Compared to the prior art that requires a refraction and a reflection when the light re-enters, the number of reflections is reduced, and the optical efficiency can therefore be improved.

The second prism faces of the lens cuts through which the light re-enters the light guide lens are formed in a flat shape that is substantially parallel to the front face from which the re-incident light exits. This enables easier and more accurate control of the light distribution compared to the prior art, and the optical efficiency can therefore be further improved.

Preferably, the vehicle lighting device further includes:
- another light source that is disposed opposite an end at a rear side in the longitudinal direction of the light guide lens, wherein each of the lens cuts further comprises a front third prism face that continues to a front end of the second prism face, and wherein light that has entered the light guide lens from the other light source and has been guided toward the front side is internally reflected forward on the third prism face.

According to the present invention, the light emitted from the other light source enters the light guide lens through the end at the rear side in the longitudinal direction, is guided inside the light guide lens in the longitudinal direction thereof, is then internally reflected forward on the third prism faces of the lens cuts in the rear face, and exits forward through the front face.

In this way, the first prism faces and the second prism faces are used for the light source at the front side (as the exit surface and the re-entrance surface) while the third prism faces are used for the other light source at the rear side. That is, the prism faces can be functionally independent from each other.

This enables individually designing each prism face for its own specialized functionality, and the optical efficiency can therefore be further improved.

BRIEF DESCRIPTION OF THE DRAWINGS

The present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENT

Figure 1:
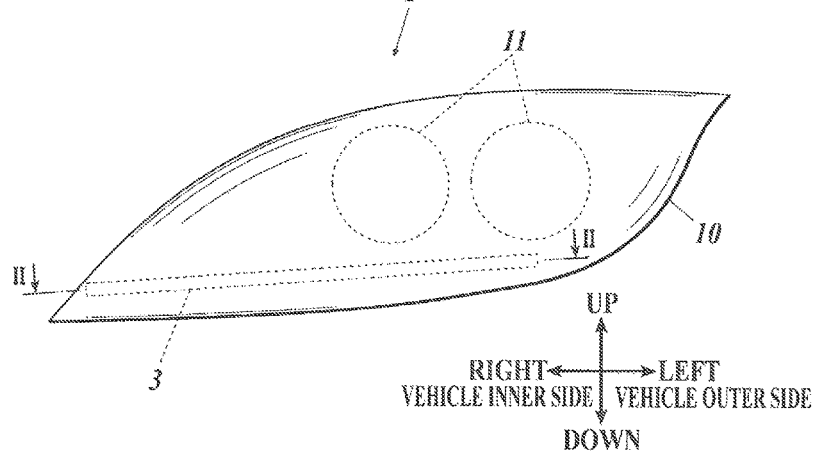
FIG. 1 is a front view of a vehicle lighting device according to an embodiment.

Hereinafter, an embodiment of the present invention will be described referring to the drawings. Though various technical limitations which are preferable to perform the present invention are included in the after-mentioned embodiment, the scope of the invention is not limited to the following embodiment and the illustrated examples.

Figure 2:
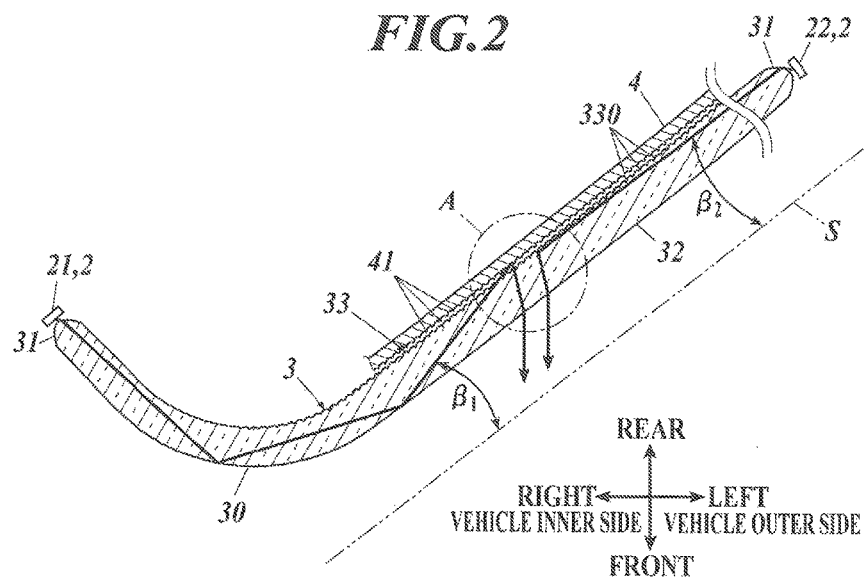
FIG. 2 is a cross sectional view taken along the line II-II in FIG. 1.
Figure 3:
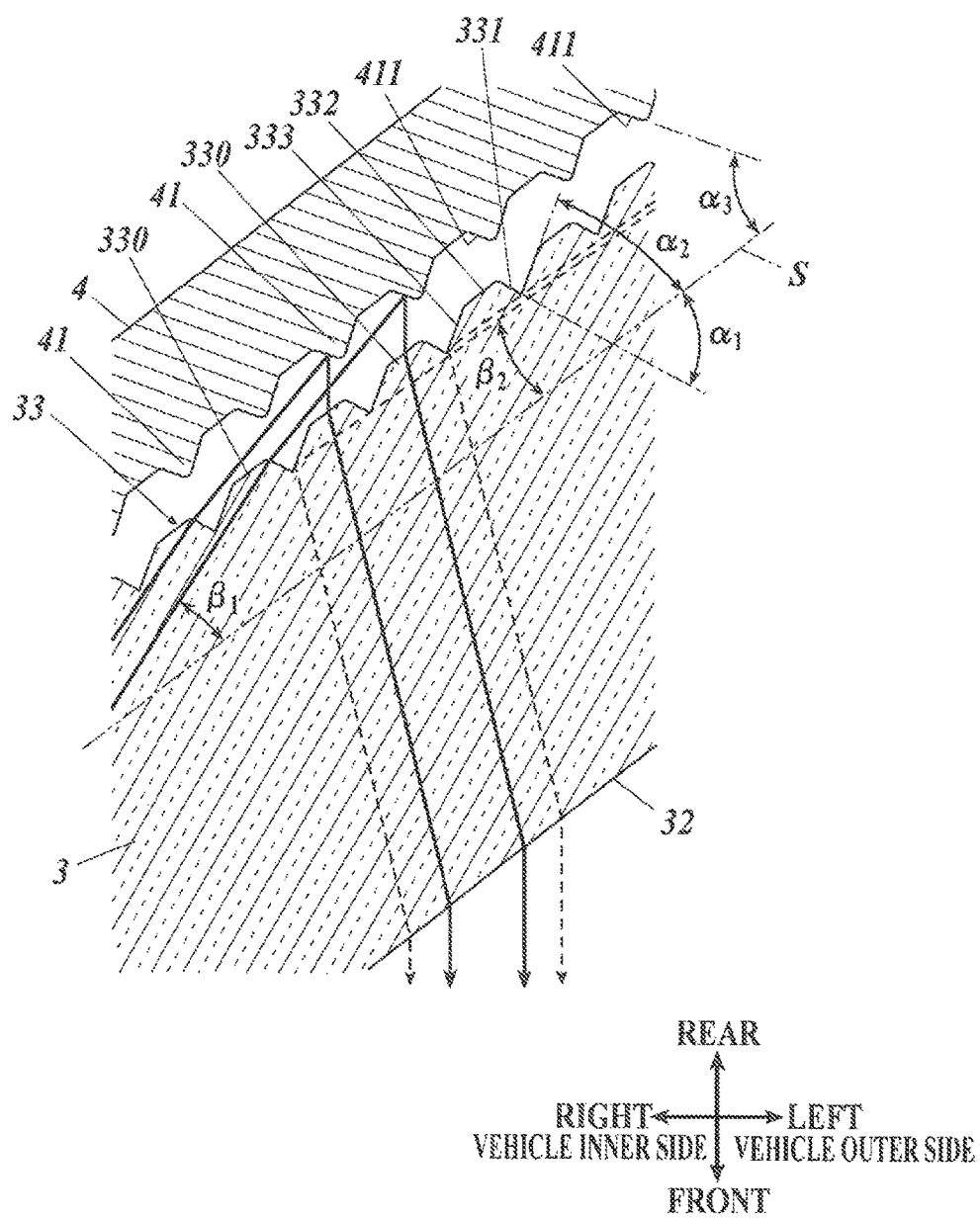
FIG. 3 is an enlarged view of Portion A in FIG. 2.

FIG. 1 is a front view of a vehicle lighting device 1 according to the embodiment, FIG. 2 is a cross sectional view taken along the line II-II in FIG. 1, and FIG. 3 is an enlarged view of Portion A in FIG. 2.

In the following description, the terms "front", "rear", "left", "right", "up" and "down" indicate, unless otherwise noted, the directions from the vehicle lighting device 1, i.e. the directions from a vehicle (not shown) in which the vehicle lighting device 1 is installed.

As illustrated in FIG. 1, the vehicle lighting device 1 is a headlamp that is installed in the front left part of the vehicle (not shown). The vehicle lighting device 1 includes a plain outer lens 10 that constitutes the front face thereof. The outer lens 10 is formed in a shape that is tilted obliquely backward to the left (vehicle outer side) in a plan view along a character line of a vehicle body (not shown). In the embodiment, the outer lens 10 extends obliquely to the rear left at an angle of approximately 38° with respect to the right-left direction in a plan view. The outer lens 10 covers the front side of a lamp house, in which two lamp units 11 are housed for a main beam.

In the lower part of the lamp house, two LEDs (light emitting diodes) 2, a light guide lens 3 and a reflector 4 are housed as illustrated in FIG. 2.

The two LEDs 2, which serve as light sources for emitting light from the light guide lens 3, are composed of a first LED 21 with a light emitting surface opposed to the right end face of the light guide lens 3 and a second LED 22 with a light emitting surface opposed to the left end face of the light guide lens 3.

The light guide lens 3, which is formed in a long bar shape, is disposed extending substantially in an obliquely tilted direction with respect to the front-rear direction in a plan view. In more detail, the light guide lens 3 is tilted obliquely backward to the left (vehicle outer side) in a plan view so that it extends substantially along a reference line S that runs along the outer lens 10 (i.e. the reference line S is tilted obliquely to the rear left at an angle of approximately 38° with respect to the right-left direction in a plan view).

Further, the light guide lens 3 of the embodiment is bent in a bent part 30 so that the right end (front end) is angled obliquely to the rear right. However, this shape is merely due to the limited layout in the lamp house, and the present invention is not limited thereto. Unless otherwise noted, the following description is directed to the part of the light guide lens 3 on the left of the bent part 30 (i.e. the part substantially along the reference line S).

Both of the right and left end faces of the light guide lens 3 serve as light entrance faces 31 that lead light emitted from the opposed LEDs 2 into the light guide lens 3. The light entrance faces 31 are formed in a convex shape that bulges toward the opposed LEDs 2 and thereby collect the light emitted from the LEDs 2 in the longitudinal direction of the light guide lens 3 when the light enters the light guide lens 3.

In the light guide lens 3, the front face 32 of the part on the left of the bent part 30 is formed in long curved shape that is substantially parallel to the reference line S in a plan view and slightly bulges into a forward convex shape. The front face 32 serves as a light exit face through which light exits forward from the light guide lens 3 and also as a total reflecting surface that internally (totally) reflects the light that has entered the light guide lens 3 through the light entrance face 31.

In the light guide lens 3, the back face 33 of the part on the left of the bent part 30 has lens cuts 330 that are continuously aligned in the longitudinal direction of the light guide lens 3 (i.e. along the reference line S) substantially over the whole length.

As illustrated in FIG. 3, each of the lens cuts 330 extends in the up-down direction and has a uniform trapezoidal cross section. Each of the lens cuts 330 includes a first prism face 331 at the rear side (left side) in the longitudinal direction of the light guide lens 3, a second prism face 332 at the center in the longitudinal direction and a third prism face 333 at the front side (right side) in the longitudinal direction.

The first prism face 331 stands backward at a steep angle with respect to the longitudinal direction of the light guide lens 3. In more detail, the first prism face 331 is tilted at an angle α1 with respect to the reference line S in a plan view, which is relatively close to the right angle (approximately 67° in the embodiment). The light in the light guide lens 3 that has entered through the right light entrance face 31 exits backward from the light guide lens 3 though the first prism face 331, where the light is slightly refracted.

The second prism face 332, which smoothly continue with the rear ends of the first prism face 331 and the third prism face 333, is formed in a flat shape that is substantially parallel to the longitudinal direction of the light guide lens 3. That is, the second prism face 332 and front face 32 of the light guide lens 3 are substantially parallel to each other in a plan view. The light that has exited backward from the light guide lens 3 through the first prism face 331 and has been reflected on a reflector 4 re-enters the light guide lens 3 through the second prism face 332.

The third prism face 333 stands backward at a relatively moderate angle with respect to the longitudinal direction of the light guide lens 3. In more detail, the third prism face 333 is tilted at an angle α2 with respect to the reference line S in a plan view, which is less than the angle α1 (approximately 32° in the embodiment). The light in the light guide lens 3 that has entered through the left light entrance face 31 is internally (totally) reflected forward on the third prism face 333.

The reflector 4 is disposed close to the rear side of the part of the light guide lens 3 on the left of the bent part 30 and extends along the longitudinal direction thereof. The reflector 4 thus covers the rear face 33 of the light guide lens 3. The front face of the reflector 4 has reflecting protrusions 41 that are aligned in the longitudinal direction of the light guide lens 3 at intervals corresponding to the grooves between the lens cuts 330 in the rear face 33 of the light guide lens 3.

Each of the reflecting protrusions 41 has a front (right) face that is opposed to the first prism face 331 of each of the lens cuts 330 of the light guide lens 3 and serves as a reflecting surface 411. The reflecting surface 411 is tilted at an angle α3 (approximately 57° in the embodiment) with respect to the reference line S in a plan view. The light that has exited backward from the light guide lens 3 through the first prism face 331 of a lens cuts 330 is reflected on the reflecting surface 411 toward the second prism face 332 of a different lens cut 330 that is located behind the lens cut 330 (the second hind lens cut 330 in the embodiment).

In the vehicle lighting device 1 with the above-described configuration, the light that is substantially radially emitted from the first LED 21, which is the right one of the two LEDs 2, is collected by the light entrance face 31 at the right end of the light guide lens 3 and thus enters the light guide lens 3 as illustrated in FIG. 2. The light that has entered the light guide lens 3 is internally reflected at the bent part 30 and the front face 32 of the light guide lens 3 into a direction slightly tilted obliquely to the rear left at an angle β1 (approximately 17° in the embodiment) with respect to the reference line S, while the light is also diffused within an angle of from 1° to 3° in a plan view.

As illustrated in FIG. 3, the light then exit backward from the light guide lens 3 through the first prism faces 331 of the lens cuts 330, which are disposed in the rear face 33 of the light guide lens 3 and stand backward at the steep angle α1 with respect to the longitudinal direction of the light guide lens 3. The light that has exited backward from the light guide lens 3 is reflected forward on the reflecting surfaces 411 in the front face of the reflector 4 at an acute angle. The light then re-enters the light guide lens 3 through the flat second prism faces 332 of the different lens cuts 330, where the light is refracted. The lens cuts through which the light re-enters are respectively the second hind lens cuts from the lens cuts 330 through which the light has exited. The light then exits forward through the front face 32 of the light guide lens 3 which is substantially parallel to the second prism faces 332, where the light is refracted into a direction substantially parallel to the front-rear direction.

On the other hand, the light that is substantially radially emitted from the second LED 22, which is the left one of the two LEDs 2, is collected by the light entrance face 31 at the left end of the light guide lens 3 and thus enters the light guide lens 3 as illustrated in FIG. 2. When entering the light guide lens 3, the light is collected by the light entrance face 31 into the direction that is obliquely tilted to the front right at an angle β2 (3° in the embodiment) with respect to the reference line S, which diffuses within an angle of from 1° to 3° in a plan view.

As illustrated in FIG. 3, the light is internally reflected forward on the third prism faces 333 of the lens cuts 330 in the rear face 33 of the light guide lens 3, which stand backward at the relatively moderate angle α2 with respect to the longitudinal direction of the light guide lens 3. Then, the light exits forward from the light guide lens 3 through the front face 32, where it is refracted into a direction substantially parallel to the front-rear direction.

In this way, in the vehicle lighting device 1 of this embodiment, the light that is emitted from the first LED 21 enters the light guide lens 3 through the right end at the front side in the longitudinal direction, is guided inside the light guide lens 3 substantially along the longitudinal direction thereof, and then exits backward from the light guide lens 3 through the first prism faces 331 of the lens cuts 330 in the rear face 33. The light is reflected forward on the reflector 4 and re-enters the light guide lens 3 through the flat second prism faces 332 of the lens cuts 330 substantially parallel to the front face 32 of the light guide lens 3, in which the light that has exited from a lens cut 330 re-enters through a different light cut 330 that is located behind the light cut 330. Thereafter, the light exits forward through the front face 32.

In this way, the light undergoes only a refraction when it re-enters the light guide lens 3 through the second prism faces 332 of the lens cuts 330. Compared to the prior art that requires a refraction and a reflection when the light re-enters, the number of reflections is reduced, and the optical efficiency can therefore be improved. Since every refraction or reflection on a light guide material such as acrylic resin generally causes a several percent loss of light, the optical efficiency can be expected to be improved corresponding to the loss compared to the prior art.

The second prism faces 332 of the lens cuts 330 through which the light re-enters the light guide lens 3 are formed in a flat shape that is substantially parallel to the front face 32 through which the re-entered light exits. This enables easier and more accurate control of the light distribution compared to the prior art, and the optical efficiency can therefore be further improved.

The light that is emitted from the second LED 22 enters the light guide lens 3 through the left end at the rear side in the longitudinal direction, is guided inside the light guide lens 3 along the longitudinal direction thereof, is then internally reflected forward on the third prism faces 333 of the lens cuts 330 in the rear face 33, and exits forward through the front face 32.

In this way, the first prism faces 331 and the second prism faces 332 are used for the front first LED 21 (as the exit surface and the re-entrance surface) while the third prism faces 333 are used for the rear second LED 22. That is, the prism faces can be functionally independent from each other.

This enables individually designing each prism face for its specialized functionality, and the optical efficiency can therefore be further improved.

Such improvements in optical efficiency can be expected to produce secondary advantageous effects including better lighting feel and a longer light guide lens 3 and furthermore, a reduction of the power consumption of the LED 2 and the resultant improvement of the fuel efficiency.

In addition, since the optical efficiency of the front first LED 21 is improved, it is possible to reduce the proportion of the load (output) on the rear second LED 22. This enables reducing the number of chips and heat sinks of the second LED 22, and a reduction in cost and weight can therefore be achieved.

The embodiments of the present invention are not limited to the above-described embodiment, and suitable changes can be made without departing from the spirit of the present invention.

Figure 4:
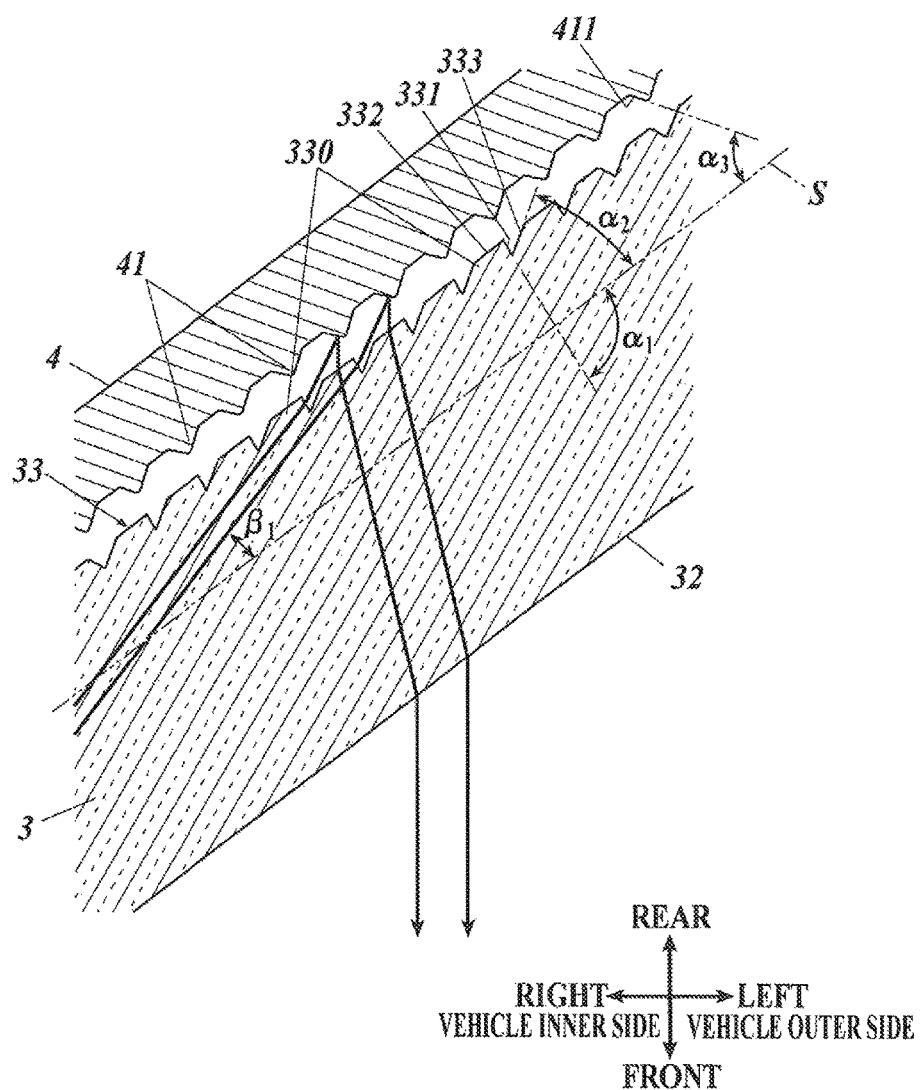
FIG. 4 illustrates a variation of the vehicle lighting device according to the embodiment.

For example, in the above-described embodiment, the light exits backward from the light guide lens 3 through the first prism faces 331 of lens cuts 330, is reflected on the reflector 4, and then re-enters the light guide lens 3 through second prism faces 332 of different lens cuts 330 that are respectively the second hind lens cuts from the lens cuts 330 through which the light has exited. However, the light may re-enter through any lens cut 330 that is located behind the lens cut 330 through which the light has exited. For example, the light may exit respectively through the rear adjacent lens cuts as illustrated in FIG. 4.

In this case, it should be understood well that the shape and the like of the lens cuts 330 of the light guide lens 3 and the reflecting protrusions 41 of the reflector 4 have to be correctly adjusted. In the example of FIG. 4 for example, the angle α1 of the first prism face 331 and the angle α2 of the third prism faces 333 of the lens cut 330 and the angle α3 of the reflecting surfaces 411 of the reflecting protrusions 41 are respectively adjusted to approximately 50°, approximately 32° and approximately 97° with respect to the reference line S. Further, the angle β1 of the light that enters the light guide lens 3 from the front first LED 21 and travels toward the rear face 33 is adjusted to approximately 15° with respect to the reference line S.

It is also required to correctly adjust the shape of the lens cuts 330 of the light guide lens 3 and the reflecting protrusions 41 of the reflector 4 according to the orientation of the light guide lens 3, the distance between the light guide lens 3 and the reflector 4 and the like.

Figure 5:
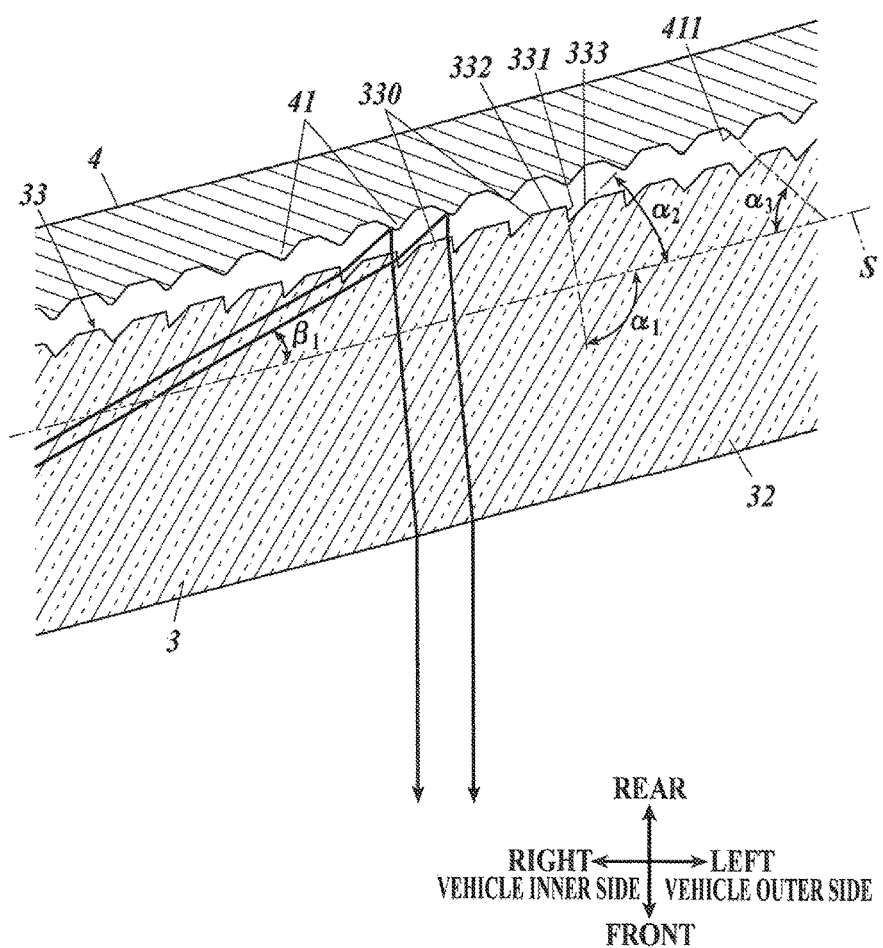
FIG. 5 illustrates another variation of the vehicle lighting device according to the embodiment.
Figure 6A:
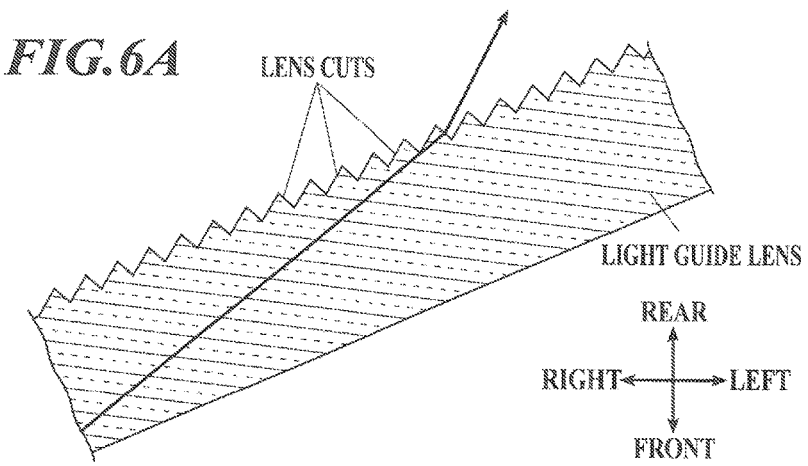
FIG. 6A illustrates a vehicle lighting device of a prior art.
Figure 6B:
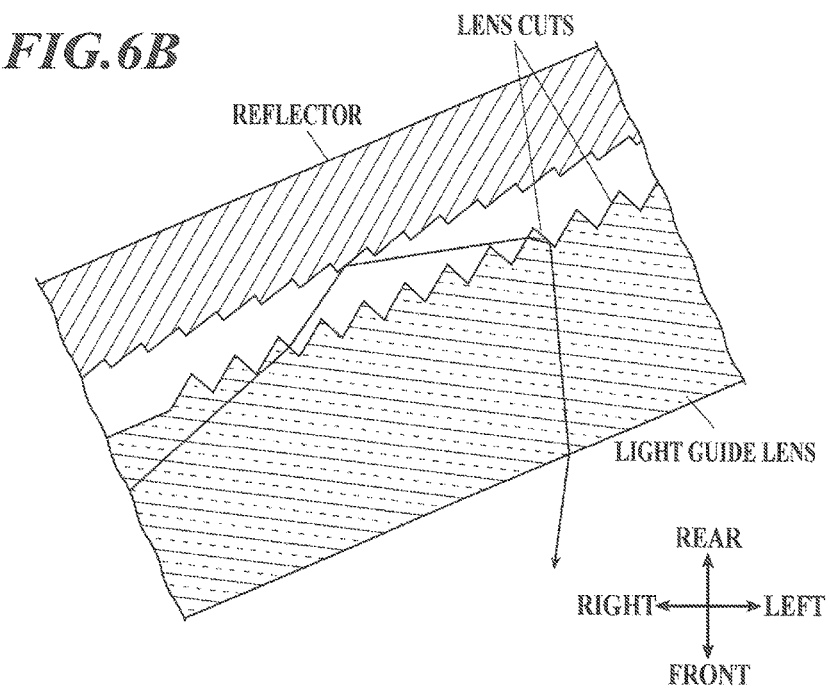
FIG. 6B illustrates a vehicle lighting device of a prior art.

Specifically, when the light guide lens 3 extends in a direction (reference line S) that is less tilted than in the above-described embodiment as illustrated in FIG. 5 (e.g. approximately 15° with respect to the right-left direction in a plan view), it is required to adjust the angle α1 of the first prism faces 331 and the angle α2 of the third prism faces 333 of the lens cuts 330 and the angle α3 of the reflecting surface 411 of the reflecting protrusions 41 respectively to approximately 97°, approximately 32° and approximately 39° with respect to the reference line S. Further, in the example of FIG. 5, the angle β1 of the light that enters the light guide lens 3 from the front first LED 21 and travels toward the rear face 33 is adjusted to approximately 15° with respect to the reference line S.

While the vehicle lighting device 1 is a headlamp, the vehicle lighting device of the present invention is suitably applicable as any lamp in addition to a headlamp that emits light forward from a long light guide lens extending in a direction obliquely tilted with respect to the front-rear direction.

What is claimed is:

1. A vehicle lighting device, comprising:
an elongated light guide lens disposed extending in a direction obliquely tilted with respect to a front-rear direction of the vehicle;
a light source disposed opposite an end at a front side in a longitudinal direction of the light guide lens;
another light source disposed opposite an end at a rear side in the longitudinal direction of the light guide lens; and
a reflector disposed behind the light guide lens along the longitudinal direction,
wherein the light guide lens comprises a front face substantially parallel to the longitudinal direction and a rear face with lens cuts aligned in the longitudinal direction,
wherein each of the lens cuts comprises a first prism face that stands backward at an angle that is not larger than 97° but larger than 67° with respect to the longitudinal direction, a second prism face that is formed in a flat shape substantially parallel to the front face and continues to a rear end of the first prism face, and a third prism face which continues to a front end of the second prism face and which stands backward at an angle that is less than the angle of the first prism face with respect to the longitudinal direction of the light guide lens,
wherein a front face of the reflector has reflecting protrusions that are aligned in the longitudinal direction of the light guide lens at intervals corresponding to grooves between the lens cuts in the rear face of the light guide lens,
wherein light that has exited backward from the light guide lens through the first prism face of a particular lens cut is reflected forward on the reflector toward the second prism face of a different lens cut that is located rearward of the particular lens cut, and
wherein light that has entered the light guide lens from the other light source and has been guided toward the front side is internally reflected forward on the third prism face.

2. The vehicle lighting device according to claim 1, wherein the light guide lens has a bent part at the end on the front side in the longitudinal direction of the light guide lens so that the light guide lens is bent obliquely backward in the bent part.

* * * * *